(12) United States Patent
Kasai et al.

(10) Patent No.: US 8,493,991 B2
(45) Date of Patent: Jul. 23, 2013

(54) SERIAL BUS TRANSMISSION SYSTEM

(75) Inventors: Yuji Kasai, Tsukuba (JP); Eiichi Takahashi, Tsukuba (JP); Masahiro Murakawa, Tsukuba (JP); Tetsuya Higuchi, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 282 days.

(21) Appl. No.: 12/988,939

(22) PCT Filed: Apr. 20, 2009

(86) PCT No.: PCT/JP2009/057830
§ 371 (c)(1),
(2), (4) Date: Jan. 12, 2011

(87) PCT Pub. No.: WO2009/131086
PCT Pub. Date: Oct. 29, 2009

(65) Prior Publication Data
US 2011/0142066 A1    Jun. 16, 2011

(30) Foreign Application Priority Data
Apr. 21, 2008   (JP) ................................. 2008-109904

(51) Int. Cl.
| | |
|---|---|
| *H04B 7/212* | (2006.01) |
| *H04B 1/44* | (2006.01) |
| *H04Q 11/00* | (2006.01) |
| *H04J 3/00* | (2006.01) |
| *H04L 12/40* | (2006.01) |
| *H04L 7/00* | (2006.01) |
| *H04W 4/00* | (2009.01) |

(52) U.S. Cl.
USPC ........... 370/442; 370/462; 370/366; 370/282; 370/438; 370/364; 370/348; 370/329; 370/337; 375/356

(58) Field of Classification Search
USPC ................. 370/442, 462, 366, 282, 438, 364, 370/348, 329, 337; 375/356
See application file for complete search history.

(56) References Cited

U.S. PATENT DOCUMENTS 6,944,153 B1 * 9/2005 Buckland et al. ............. 370/376
2003/0123473 A1 * 7/2003 Satoh et al. ................... 370/442
(Continued)

FOREIGN PATENT DOCUMENTS

| JP | 58 085692 | 5/1983 |
| JP | 6 68000 | 3/1994 |

(Continued)

OTHER PUBLICATIONS

International Search Report issued Jul. 7, 2009 in PCT/JP09/057830 filed Apr. 20, 2009.

(Continued)

*Primary Examiner* — Michael Thier
*Assistant Examiner* — Yaotang Wang
(74) *Attorney, Agent, or Firm* — Oblon, Spivak, McClelland, Maier & Neustadt, L.L.P.

(57) ABSTRACT

A master node (12) sends an identification signal for designating a communication channel in an identification signal time slot. When the own node matches the node in which the communication channel designated by the identification signal sent from the master node (12) is set in the identification signal time slot, the master node (12) and slave nodes ($13_1$ to $13_n$) each perform data transmission via the communication channel, based on the set contents of the communication channel, in the data transmission time slot corresponding to the identification signal time slot in which the identification signal has been sent.

8 Claims, 12 Drawing Sheets

U.S. PATENT DOCUMENTS

2004/0042449 A1* 3/2004 Kamimura et al. ........... 370/366
2009/0022255 A1* 1/2009 Kanekawa et al. ........... 375/356

FOREIGN PATENT DOCUMENTS

| | | |
|---|---|---|
| JP | 9-294131 | 11/1997 |
| JP | 10 210059 | 8/1998 |
| JP | 2005-159754 | 6/2005 |

OTHER PUBLICATIONS

Tsukasa Nakao, Introduction to Practical Use of Single-, Two-, and Three-Wire Interfaces of Microcomputers, CQ Publishing Co., Ltd., Jun. 15, 2007, 23 pages (with partial English translation).

* cited by examiner

FIG.1
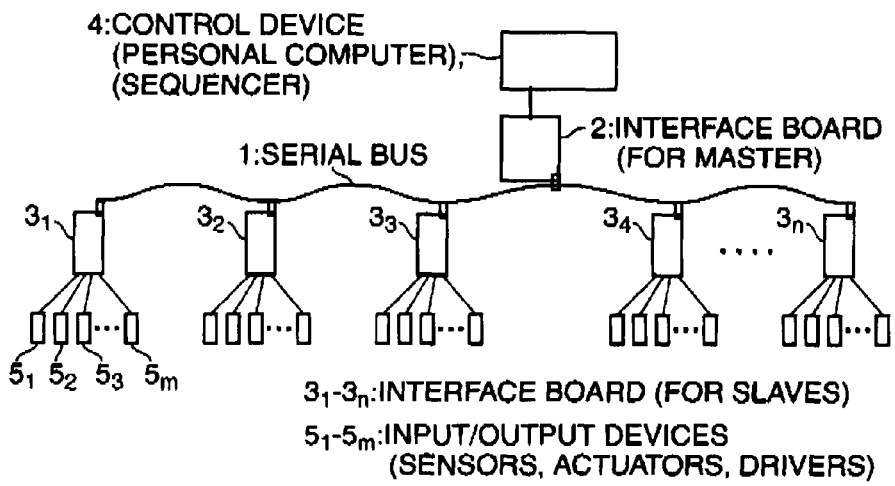
FIG.2
(a) NETWORK CONFIGURATION DIAGRAM
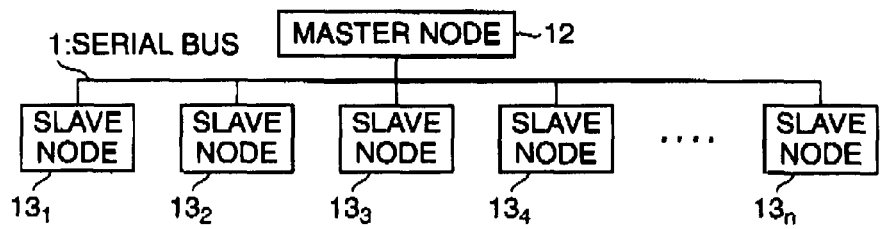
(b) EXAMPLES OF COMMUNICATION CHANNELS
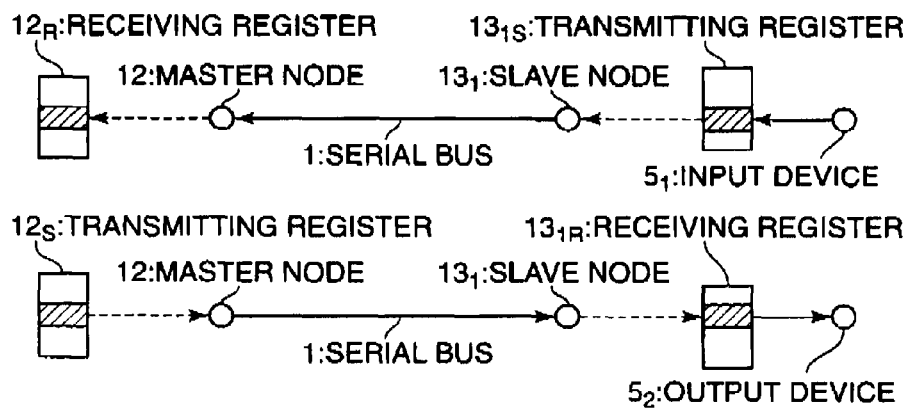

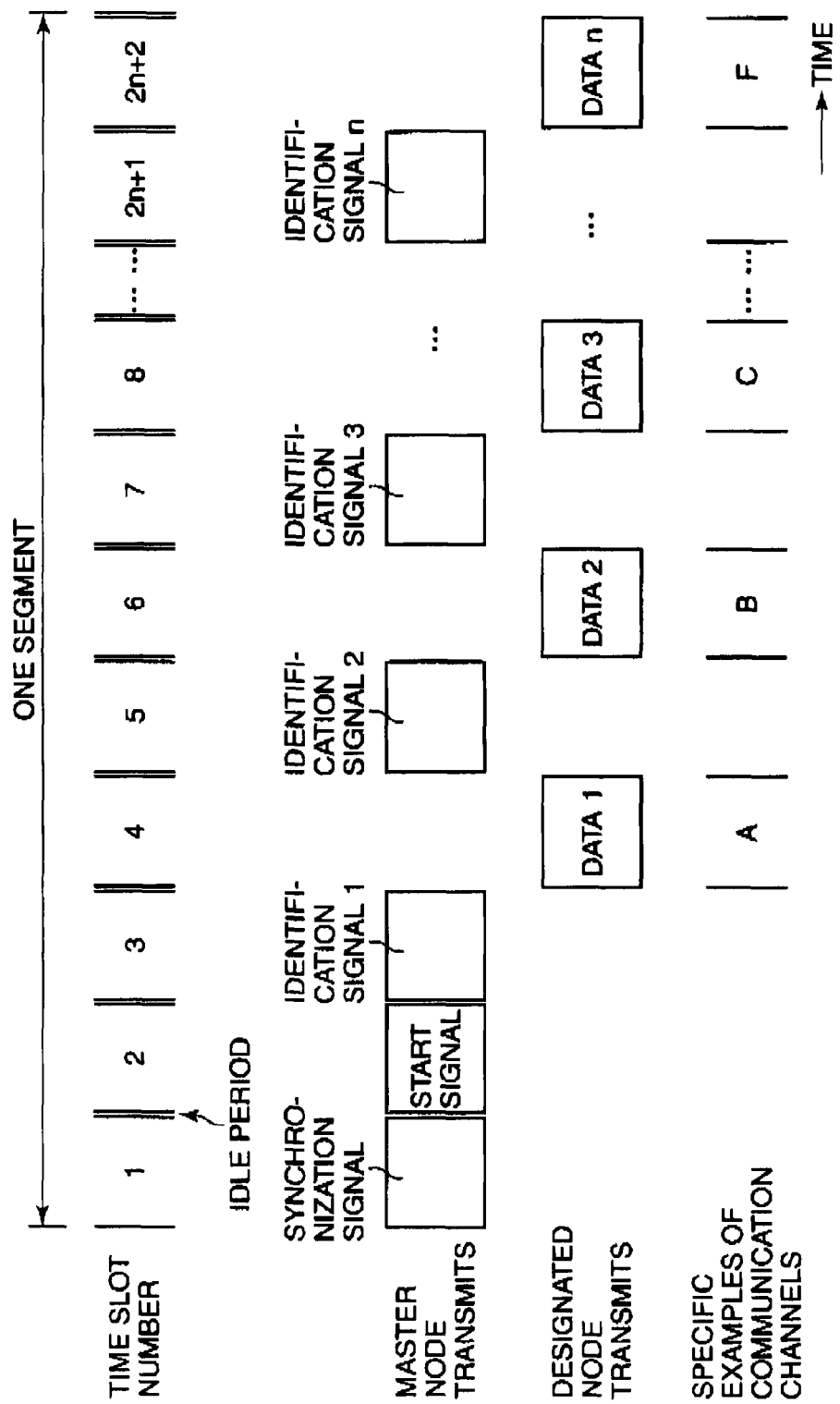

FIG.4

| IDENTIFICATION SIGNAL (COMMUNICATION CHANNEL) | NODE FOR WHICH OPERATION IS TO BE PERFORMED | TRANSMITTING OR RECEIVING | ADDRESS IN DATA REGISTER |
|---|---|---|---|
| 000 0000 0001 (A) | SLAVE 1 | TRANSMITTING | 01H |
|  | MASTER | RECEIVING | 01H |
| 000 0000 0010 (B) | SLAVE 2 | TRANSMITTING | 01H |
|  | MASTER | RECEIVING | 02H |
| 000 0000 0011 (C) | SLAVE 3 | TRANSMITTING | 01H |
|  | MASTER | RECEIVING | 03H |
| 000 0000 0100 (D) | SLAVE 3 | TRANSMITTING | 02H |
|  | MASTER | RECEIVING | 04H |
| 000 0000 0101 (E) | SLAVE 1 | TRANSMITTING | 02H |
|  | MASTER | RECEIVING | 05H |
|  | SLAVE 2 | RECEIVING | 01H |
| 000 0000 0110 (F) | MASTER | TRANSMITTING | 01H |
|  | SLAVE 1 | RECEIVING | 01H |
|  | SLAVE 2 | RECEIVING | 02H |
|  | SLAVE 3 | RECEIVING | 01H |

FIG.5

| TIME SLOT NUMBER | SIGNAL TYPE | SENDING NODE | NODE OF OTHER END OF COMMUNICATION |
|---|---|---|---|
| 1 | SYNCHRONIZATION SIGNAL | MASTER | ALL SLAVES |
| 2 | START SIGNAL | MASTER | ALL SLAVES |
| 3 | 000 0000 0001 | MASTER | SLAVE 1 |
| 4 | DATA | SLAVE 1 | MASTER |
| 5 | 000 0000 0010 | MASTER | SLAVE 2 |
| 6 | DATA | SLAVE 2 | MASTER |
| 7 | 000 0000 0011 | MASTER | SLAVE 3 |
| 8 | DATA | SLAVE 3 | MASTER |
| 9 | 000 0000 0100 | MASTER | SLAVE 3 |
| 10 | DATA | SLAVE 3 | MASTER |
| 11 | 000 0000 0101 | MASTER | SLAVES 1 AND 2 |
| 12 | DATA | SLAVE 1 | MASTER, SLAVE 2 |
| ⋮ | ⋮ | ⋮ | ⋮ |
| 2n+1 | 000 0000 0110 | MASTER | SLAVES 1 TO 3 |
| 2n+2 | DATA | MASTER | SLAVES 1 TO 3 |

FIG.6

(a) EXAMPLE 1 OF COMMUNICATION CHANNEL STRUCTURE IN SEGMENT

| SEGMENT NUMBER | COMMUNICATION CHANNEL STRUCTURE |
|---|---|
| 1 | A, B, C, D, E, F |

(b) EXAMPLE 2 OF COMMUNICATION CHANNEL STRUCTURE IN SEGMENT

| SEGMENT NUMBER | COMMUNICATION CHANNEL STRUCTURE |
|---|---|
| 1 | A, B, C, A, D, E, A, F |

(c) EXAMPLE 3 OF COMMUNICATION CHANNEL STRUCTURE IN SEGMENTS

| SEGMENT NUMBER | COMMUNICATION CHANNEL STRUCTURE |
|---|---|
| 1 | A, B, C, D, E, F |
| 2 | A, B |
| 3 | A, B, C, D |
| 4 | A, B |

FIG. 10

(a) MASTER NODE

| IDENTIFICATION SIGNAL | TRANSMITTING OR RECEIVING | ADDRESS IN DATA REGISTER |
|---|---|---|
| 000 0000 0001 | RECEIVING | 01H |
| 000 0000 0010 | RECEIVING | 02H |
| 000 0000 0011 | RECEIVING | 03H |
| 000 0000 0100 | RECEIVING | 04H |
| 000 0000 0101 | RECEIVING | 05H |
| 000 0000 0110 | TRANSMITTING | 01H |

(b) SLAVE NODE $13_1$

| IDENTIFICATION SIGNAL | TRANSMITTING OR RECEIVING | ADDRESS IN DATA REGISTER |
|---|---|---|
| 000 0000 0001 | TRANSMITTING | 01H |
| 000 0000 0101 | TRANSMITTING | 02H |
| 000 0000 0110 | RECEIVING | 01H |

(c) SLAVE NODE $13_2$

| IDENTIFICATION SIGNAL | TRANSMITTING OR RECEIVING | ADDRESS IN DATA REGISTER |
|---|---|---|
| 000 0000 0010 | TRANSMITTING | 01H |
| 000 0000 0101 | RECEIVING | 01H |
| 000 0000 0110 | RECEIVING | 02H |

(d) SLAVE NODE $13_3$

| IDENTIFICATION SIGNAL | TRANSMITTING OR RECEIVING | ADDRESS IN DATA REGISTER |
|---|---|---|
| 000 0000 0011 | TRANSMITTING | 01H |
| 000 0000 0100 | TRANSMITTING | 02H |
| 000 0000 0110 | RECEIVING | 01H |

FIG.11
(a) RECEIVED SIGNAL PROCESSING UNIT
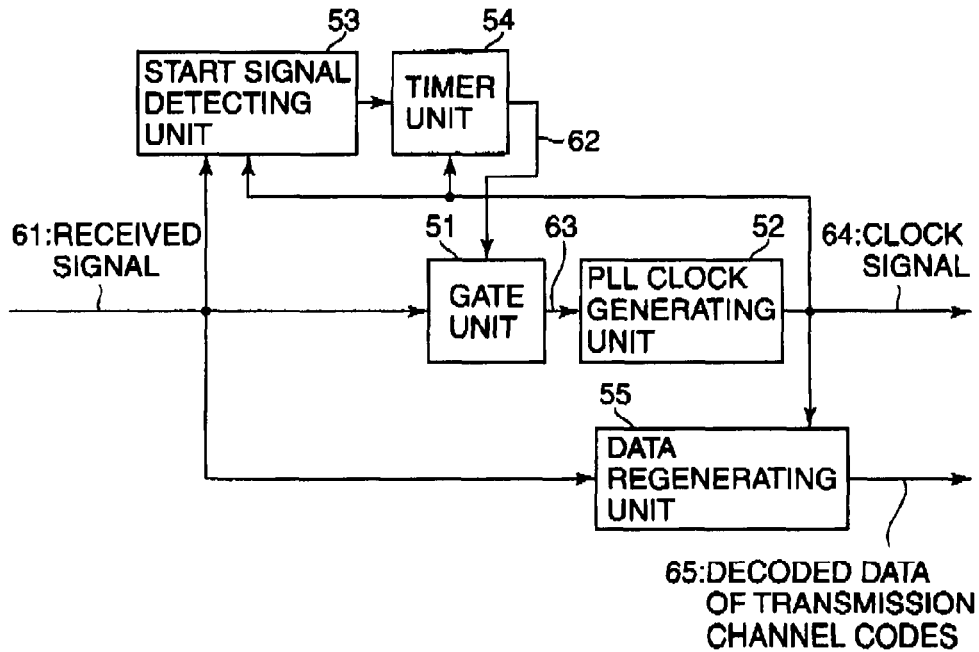
(b) SIGNAL WAVEFORMS OF RESPECTIVE BLOCKS
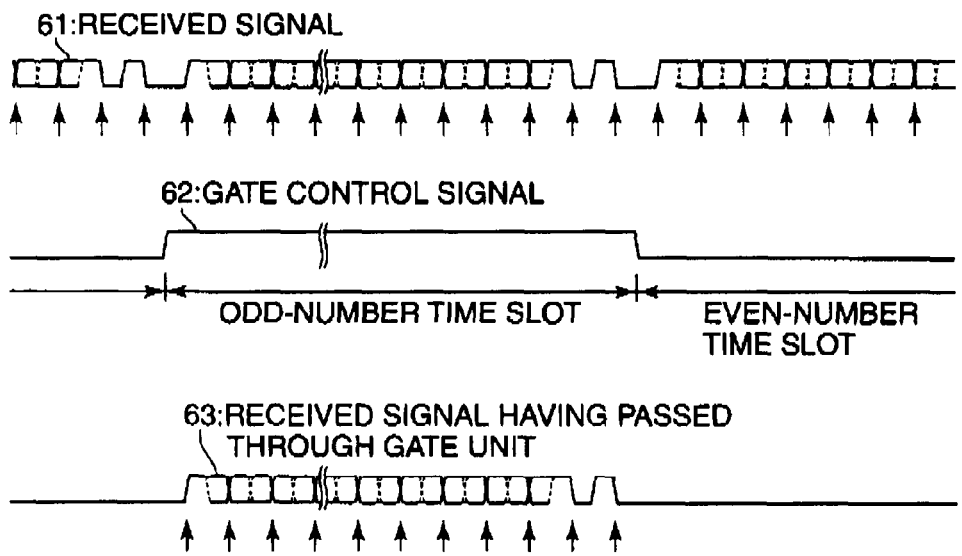

FIG. 13

(a) SET CONTENTS CORRESPONDING TO IDENTIFICATION SIGNALS FOR SETTING OPERATIONS

| IDENTIFICATION SIGNAL | NODE TO PERFORM OPERATION | TRANSMITTING OR RECEIVING | ADDRESS IN DATA REGISTER |
|---|---|---|---|
| 111 1111 0000 | MASTER | TRANSMITTING | F0H |
| | ALL SLAVES | RECEIVING | F0H |
| 111 1111 0001 | MASTER | TRANSMITTING | F1H |
| | ALL SLAVES | RECEIVING | F1H |
| 111 1111 0010 | MASTER | TRANSMITTING | F2H |
| | ALL SLAVES | RECEIVING | F2H |
| 111 1111 0011 | MASTER | TRANSMITTING | F3H |
| | ALL SLAVES | RECEIVING | F3H |
| 111 1111 0100 | MASTER | TRANSMITTING | F4H |
| | ALL SLAVES | RECEIVING | F4H |
| 111 1111 0101 | MASTER | TRANSMITTING | F5H |
| | ALL SLAVES | RECEIVING | F5H |

(b) DATA FOR THE SETTING OPERATIONS TO BE WRITTEN INTO THE DATA REGISTERS

| ADDRESS IN DATA REGISTER | DATA FOR SETTING OPERATIONS |
|---|---|
| F0H | NUMBER OF SLAVE NODE FOR WHICH OPERATION IS TO BE PERFORMED |
| F1H | IDENTIFICATION SIGNAL |
| F2H | TRANSMITTING OR RECEIVING |
| F3H | ADDRESS IN DATA REGISTER |
| F4H | CHECKSUMS OF DATA AT F0H THROUGH F3H |
| F5H | DATA FOR SPECIAL OPERATIONS SUCH AS WRITE COMMAND BIT |

SERIAL BUS TRANSMISSION SYSTEM

TECHNICAL FIELD

The present invention relates to a serial bus transmission system that is a transmissions system in which one master node and slave nodes located at various points are connected to a serial bus. The serial bus transmission system is capable of bidirectionally transmitting data between the master node and each of the slave nodes, and between the slave nodes.

More specifically, measurement data is transmitted from sensors placed at various points to a control device, and control data is transmitted from the control device to drivers, actuators, and the like placed at various points.

BACKGROUND ART

In a large-scale system such as an industrial machinery system or manufacturing facilities, input/output devices such as a large number of sensors and a large number of drivers, actuators, and the like are placed at various points. Meanwhile, a control device such as a computer or a sequencer is provided to control and monitor those devices.

If the sensors are photo-interrupters or the likes, on/off data is transmitted to the control device through transmission channels. If the sensors are to detect temperature, voltage, or the like, data generated by A/D converting to the on/off data is transmitted to the control device through transmission channels. On the other hand, control data is transmitted from the control device to drivers, actuators, and the like through transmission channels, so as to control motors, cylinders, and the like.

If one cable is used at each installation point of the sensors and drivers to form the above transmission channels, an extremely large number of cables are used in total. Therefore, many problems are caused, as it is difficult to reduce the size of the system and maintain the system.

On the other hand, serial bus transmission systems have been known. A serial bus transmission system is a network in which slave nodes and a master node that controls the bus are connected in a multi-drop manner to a bus line formed with one to three signal lines (see Non-Patent Document 1).

In a serial bus transmission system, the operation of each node is determined by a combination of a signal voltage and its transition state, and each node carries out a network control flow by following predetermined procedures.

As for the network control methods, there have been a bus arbitration method by which a collision can be avoided, and control can be established even when each node arbitrarily accesses (Non-Patent Document 1, Patent Document 1), or a cyclic method by which time slots that enable sending are sequentially allotted to respective nodes in a fixed manner (Patent Document 2). If a serial bus transmission system is used as the transmission channels, the number of cables can be dramatically reduced.

In an industrial machinery system or manufacturing facilities, however, a large amount of noise is generated. Due to the noise, an abnormality is caused in the network control flow. If the noise lasts over a long period of time, the network control flow is disturbed to a great extent, and the large-scale system might have a fatal error in an operation.

PRIOR-ART DOCUMENTS

Patent Documents

Patent document 1: Japanese Patent Application Laid-Open No. H9-294131

Patent Document 2: Japanese Patent Application Laid-Open No. 2005-159754

Non-Patent Documents

Non-Patent Document 1: Tsukasa Nakao, "Introduction to Practical Use of Single-, Two-, and Three-Wire Interfaces of Microcomputers", CQ Publishing Co., Ltd., pp. 16-33 (Jun. 15, 2007)

DISCLOSURE OF THE INVENTION

Problems to be Solved by the Invention

The object of the present invention is to eliminate the above described problems, and provide a serial bus transmission system that is hardly affected by noise and is capable of performing stable network control among a master node and slave nodes.

Means to Solve the Problems

In the invention recited in claim 1, a serial bus transmission system that performs data transmission through a communication channel that is set from one node to at least one other node among a plurality of nodes connected to a serial bus, characterized in that a plurality of time slots that are time-divided are allotted to a plurality of identification signal time slots and data transmission time slots corresponding to the respective identification signal time slots, with one of the nodes being allotted to a master node while the other nodes are allotted to slave nodes, the master node includes an identification signal sending unit that sends an identification signal from the master node in the identification signal time slots, wherein the identification signal designates the communication channel, and each of the nodes includes a data transmitting unit that, when each said node matches a node in which a communication channel designated by an identification signal sent in the identification signal time slots is set, performs data transmission through the communication channel, based on set contents of the communication channel in a data transmission time slot corresponding to the identification signal time slot in which the identification signal has been sent.

Since communication channels are set by identification signals sent from the master node, a collision caused by two or more nodes that perform sending at the same time can be avoided.

The identification signal time slots and the data transmission time slots are clearly allotted to time divided time slots, and the data transmission time slots correspond to the identification signal time slots. With this arrangement, even if data transmission cannot be performed due to noise or the like between a sending node and a receiving node where a communication channel is set when an identification signal time slot is again received. Accordingly, the reliability of the network control becomes higher.

The invention recited in claim 2, the serial bus transmission system according to claim 1, wherein time slots a predetermined period of time behind the respective identification signal time slots are allotted to the data transmission time slots corresponding to the identification signal time slots.

Since the time slots for data transmission can be clearly recognized, operations are easily performed. The above mentioned predetermined period of time can be determined by taking into consideration the processing time required since a communication channel is designated by an identification signal time slot until data transmission is actually performed.

Each time slot of an odd-number multiple of one time slot (one time slot, three time slots, or the like) behind each corresponding identification signal time slot is allotted to each of the data transmission time slots. In this manner, the identification signal time slots and the data transmission time slots are alternately allotted.

The invention recited in claim 3, the serial bus transmission system according to claim 1 or 2, wherein the communication channel is set from a specific region in a transmit data register in the one node to a specific region in a receiving register in the at least one other node.

Accordingly, in each sending node, the data to be transmitted is stored in different memory regions in a transmitting register, and can be transmitted through different communication channels, in accordance with identification signals. In each receiving node, transmitted data is stored in different memory regions in a receiving register, and can be received through different communication channels, in accordance with identification signals. As a result, the sending nodes and receiving nodes can perform different data processing operations for transmission data, in accordance with the communication channels designated by identification signals.

The invention recited in claim 4, the serial bus transmission system according to any of claims 1 to 3, wherein the time-divided time slots are allotted at intervals of an integral multiple of a clock period of the data transmission.

Accordingly, even if the identification signal time slots and the data transmission time slots cannot be received due to noise or the like, the identification signal time slots and the data transmission time slots that time slots are allotted to at intervals of an integral multiple of the clock period can be again synchronized with the clock and can be again detected with ease when the noise is eliminated. Thus, the reliability of the network control becomes higher.

The invention recited in claim 5, the serial bus transmission system according to claim 4, wherein the slave node includes a gate unit and a clock generating unit, the gate unit blocks a received signal received from the serial bus in the data transmission time slots, and allows the received signal to pass in the identification signal time slots, the clock generating unit outputs a clock signal synchronized with the received signal that has passed through the gate unit, and the data transmitting unit in each of the slave nodes performs the data transmission based on the clock signal that is output from the clock generating unit.

Since the identification signal time slots are time slots to be sent invariably from the master node, signals are sent based on an accurate clock. Accordingly, in each slave node, the clock generating unit is synchronized with the clock in the identification signal time slots, to reduce clock time errors between the master node and the slave node. Thus, data can be accurately received and sent.

The invention recited in claim 6, the serial bus transmission system according to any of claims 1 to 5, wherein each of the nodes includes a memory unit, and the memory unit stores a correspondence table that shows correspondence between one or a plurality of identification signals designating one or more of the communication channels set in said each node, and the set contents of the one or more communication channels in said each node.

Accordingly, when it is necessary to add a slave node or change the communication channels to be set in an existing slave node, the need can be flexibly satisfied by modifying the correspondence table stored in the memory unit.

If the memory unit is a rewritable memory unit, the memory unit does not need to be replaced. It is more preferable to use a nonvolatile memory unit such as a flash ROM that stores memory contents even when power is not being supplied.

The invention recited in claim 7, the serial bus transmission system according to claim 6, wherein the memory unit is a rewritable memory unit, the master node includes a setting operation unit that causes the identification signal sending unit to send a plurality of identification signals for a setting operation from the master node, and causes the data transmitting unit of the master node to send information for identifying one of the slave nodes, an identification signal designating a communication channel set in the one of the slave nodes, and the set contents of the communication channel in the one of the slave nodes, to the serial bus in data transmission time slots corresponding to identification signal time slots in which the identification signals for the setting operation have been sent, and each of the slave nodes includes a setting operation unit that causes the data transmitting unit of each said slave node to receive the information for identifying the one of the slave nodes, the identification signal designating the communication channel set in the one of the slave nodes, and the set contents of the communication channel in the one of the slave nodes in the data transmission time slots corresponding to the identification signal time slots in which the identification signals for the setting operation have been sent, and, when the received information for designating the one of the slave nodes indicates the said slave node, the setting operation unit sets a correspondence table that is stored in the rewritable memory unit in accordance with the received identification signal designating the communication channel set in the one of the slave nodes and the received set contents of the communication channel in the one of the slave nodes.

Accordingly, the correspondence table stored in the rewritable memory unit of each slave node can be set from the master node via the serial bus.

The invention recited in claim 8, the serial bus transmission system according to any of claims 1 to 7, wherein performing data transmission, with one segment being formed by the identification signal time slots and the data transmission time slots corresponding to the respective identification signal time slots.

Accordingly, data transmission can be readily finished in one segment, the same data transmission can be readily repeated by the segment unit, and data transmission can be readily performed with different segments combined. The above described one segment might include a reference signal (start signal) time slot and a synchronization signal time slot as needed.

The invention recited in claim 9, the serial bus transmission system according to claim 8, wherein a reference time slot is allotted beforehand to a time slot before the first identification signal time slot in the one segment unit, the master node includes a reference signal sending unit that sends a reference signal in the reference time slot, the reference signal having a pattern that is not to be sent in the identification signal time slots and the data transmission time slots, and each of the slave nodes each includes a reference signal time slot detecting unit that detects the reference time slot by identifying the pattern of the reference signal contained in a received signal.

Accordingly, by detecting the reference time slot, the data transmitting unit in each slave node can recognize each one segment unit, and can be referred as a processing basis to perform operations by the segment unit. Furthermore, the data transmitting unit in each slave node can recognize the locations of all the identification signal time slots and the data transmission time slots, based on the reference time slot. Even if the synchronization among the time slots is disturbed between the master node and a slave node due to noise or the like, synchronization can be restored among the time slots by detecting the reference time slot. As a result, the reliability of the network control becomes higher.

Effects of the Invention

According to the present invention, abnormal network control due to noise is prevented, and a highly-reliable serial bus transmission system is realized.

Being resistant to noise, the present invention is suitable for wireless communications using light or weak radio waves.

Since arbitrations required in the prior art are not necessary, the present invention is also effective in a transmission system having tens or hundreds of nodes in total.

BRIEF DESCRIPTION OF THE DRAWINGS

FIG. 1 is a block configuration diagram showing a specific example of an embodiment of the present invention;

FIG. 2 are configuration diagrams of a serial bus transmission system as the embodiment illustrated in FIG. 1;

FIG. 3 is an explanatory view showing the time-division transmission sequence used in the embodiment illustrated in FIG. 2;

FIG. 4 is a diagram for explaining an example of the data on which the "set contents table" for performing a communication operation in the communication channel designated by an identification signal is based;

FIG. 5 is a diagram for explaining the sending nodes and the nodes (the receiving nodes) of the other ends of communications in a case where identification signals are specifically designated in the time-division transmission sequence illustrated in FIG. 3;

FIG. 6 are diagrams for explaining examples of configurations of communication channel allotments in one segment in the time-division transmission sequence illustrated in FIG. 3;

FIG. 10 are diagrams for explaining the "set contents table" that is stored in each node in the serial bus transmission system illustrated in FIG. 2;

FIG. 11 are diagrams for explaining a clock generating operation to be performed in the received signal processing unit shown in FIG. 8;

FIG. 13 are diagrams for explaining the "identification signals for setting operations" used in the setting operations shown in FIG. 12.

BEST MODE FOR CARRYING OUT THE INVENTION

Figure 7:
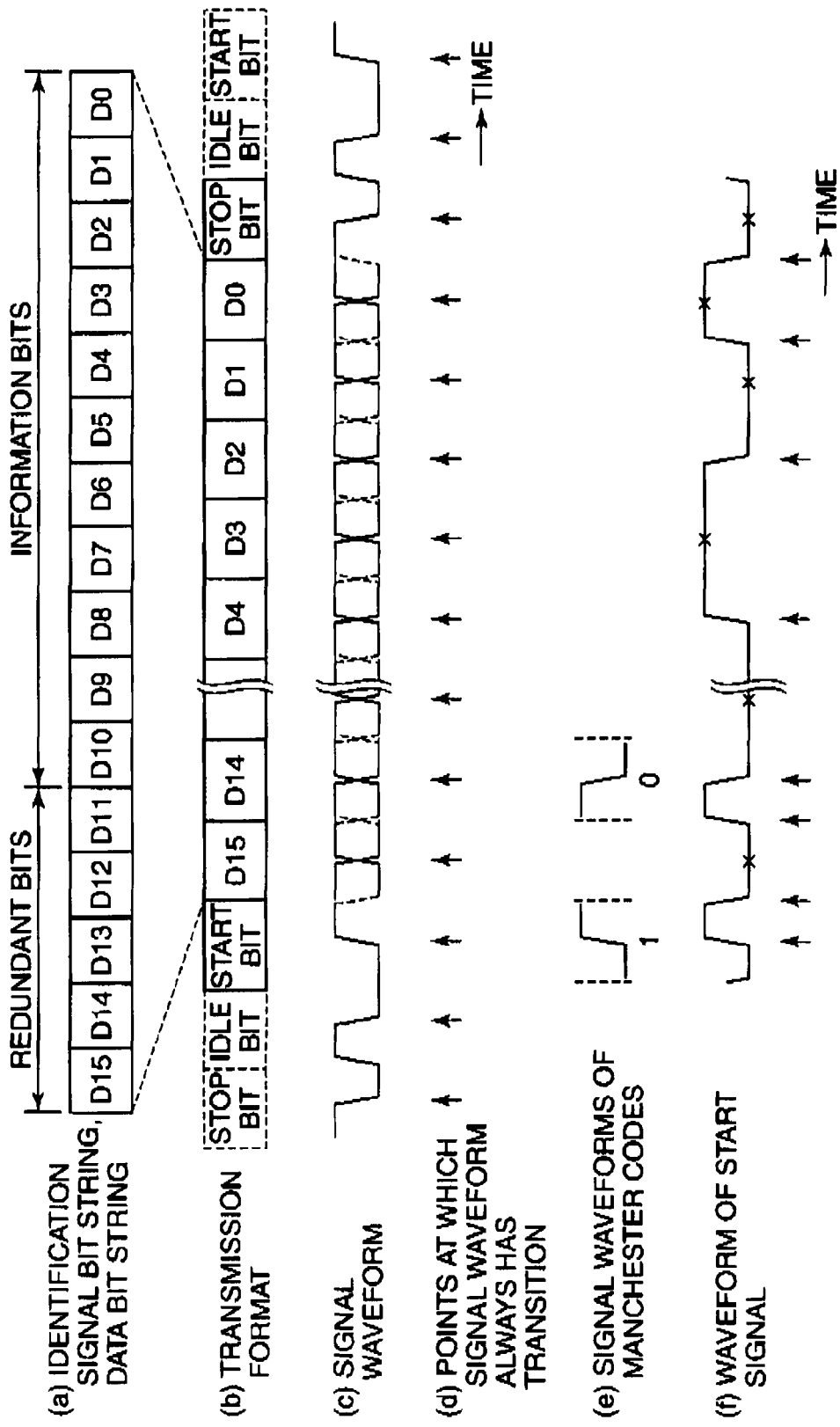
FIG. 7 are diagrams for explaining the transmission format of data bit strings and the transmission channel codes in the identification signal and data transmission time slots in the time-division transmission sequence illustrated in FIG. 3.

The following is a description of embodiments of the present invention, with reference to the accompanying drawings.

FIG. 1 is a block configuration diagram showing a specific example of an embodiment of the present invention. In this drawing, reference numeral 1 indicates a serial bus, reference numeral 2 indicates an interface board (for the master), and reference numerals $3_1$ through $3_n$ indicate interface boards (for slaves).

Reference numeral 4 indicates a control device such as a personal computer (PC) or a sequencer that is connected to the serial bus 1 via the interface board (for the master) 2.

One or more input/output devices $5_1$ through $5_m$ are connected to the interface board (for slaves) $3_1$. Input devices such as sensors, as well as output devices such as actuators and drivers, may be connected to the interface board (for slaves) $3_1$, or only input devices or only output devices may be connected to the interface board (for slaves) $3_1$. The same applies to the other interface boards (for slaves) $3_2$ through $3_n$.

The serial bus 1 is a serial transmission line such as a twisted pair signal line, and transmits data signals through a differential signal transmission method, for example. The interface board (for the master) 2 greatly differs from the interface boards (for slaves) $3_1$ through $3_n$ in the network control function. A connection standard suitable for the control device 4, and the connection standard suitable for the input/output devices $5_1$ through $5_m$ are employed, respectively. Terminating resistors are connected to the interface boards (for slaves) $3_1$ and $3_n$ connected to both ends of the serial bus 1, to prevent signal reflection at the line ends.

In a case where power is supplied from the interface board (for the master) 2 to the interface boards (for slaves) $3_1$ through $3_n$, the number of cables can be reduced by using a cable having a power line and the above mentioned signal line housed in the same outer coating (a sheath).

FIG. 2 are configuration diagrams of the embodiment of FIG. 1 regarded as a serial bus transmission system. FIG. 2(a) is a network configuration diagram, and FIG. 2(b) is an explanatory view of specific examples of communication channels.

In FIG. 2(a), the topology is of a bus type, and a master node 12 and slave nodes $13_1$ through $13_n$ are connected to the serial bus 1.

The master node device (hereinafter simply referred to as the master node) 12 is equivalent to the interface board (for the master) 2 and the control device 4 of FIG. 1, and the communication function is carried out mainly by the interface board (for the master) 2.

The slave node device (hereinafter simply referred to as the slave node) $13_1$ is equivalent to the interface board (for slaves) $3_1$, the input/output devices 5 through $5_m$, and the like shown in FIG. 1. The communication function is carried out mainly by the interface board (for slaves) $3_1$. The same applies to the other slave nodes $13_2$ through $13_n$.

Between the master node 12 and the slave nodes $13_1$ through $13_n$, the above described serial bus transmission system is capable of transmitting data bidirectionally between nodes, without distinguishing between the master node and the slave node. In doing so, data transmitted from one node can be received by more than one nodes.

Alternatively, between the master node 12 and one or more of the slave nodes $13_1$ through $13_n$, the above described serial bus transmission system may be limited to unidirectional data transmission from the master node to the one or more slave nodes, or may be limited to unidirectional transmission from the one or more slave nodes to the master node.

As shown in FIG. 2(b), communication channels are set on the serial bus 1 between the master node 12 and the slave node $13_1$.

In the embodiment of the present invention, each communication channel is defined by distinguishing the data communication direction. The communication channel from the master node 12 to the slave node $13_1$ is a different communication channel from the communication channel in the opposite direction.

The master node 12 exclusively has the control (the network control) to set the above described communication channels. As will be later described with reference to FIG. 3, the master node 12 defines time-divided time slots. The slave nodes $13_1$ through $13_n$ passively perform transmission.

In the embodiment of the present invention, the communication channels are set from a specific region of the transmit data register in one node to a specific region of the receiving register in at least one other node.

In other words, the "communication channels" are defined as the channels between the specific region (designated by an address) that stores transmitted data in the transmitting register ($12_S$ in the master node 12, $13_{1S}$ in the slave node $13_1$) that stores transmitted data, and the specific region (designated by an address) that stores received data in the receiving register ($12_R$ in the master node 12, $13_{1R}$ in the slave node $13_1$).

In a case where a sensor (the input device $5_1$, for example) is connected to the slave node $13_1$, the data of this sensor is stored in the specific region of the transmitting register $13_{1S}$. The control device 4 of the master node 12 can determine to which sensor the sensor data transmitted from the slave node $13_1$ belongs, through the communication channels. In a case where data of two or more sensors are transmitted from the same slave node, the data should be stored in different regions in the transmitting register by switching the communication channels.

In a case where one actuator (the output device $5_2$, for example) is connected to the slave node $13_1$, the data to this actuator is stored in the specific region in the receiving register $13_{1R}$. The control device 4 in the master node 12 can designate to which actuator the data received in the slave node $13_1$ is directed, through the communication channels. In a case where data is transmitted to two or more actuators in the same slave node, the data should be stored in different regions in the receiving register by switching the communication channels.

In a case where data transmitted from one node is received by two or more nodes, these channels are collectively defined as one communication channel in this specification.

Accordingly, with attention being paid to certain data, a communication channel may be defined as the channel from the location of this data prior to transmission and the location of this data after the transmission.

Other than the specific examples shown in FIG. 2(b), a communication channel may be set between slave nodes. For example, a communication channel may be set from the specific region in the transmitting register of the slave node $13_1$ to the specific region in the receiving register of the slave node $13_2$.

FIG. 3 is an explanatory view showing a time-division transmission sequence used in the embodiment illustrated in FIG. 2. The abscissa axis indicates time.

Respective time-division sections formed by dividing a communication time per a certain period of time are called time slots. In the example illustrated in the figure, a set of time slots are used as a unit, and form one segment. Data transmission is performed per one segment.

A first time slot is a time slot of a synchronization signal, and a second time slot is a time slot of a start signal (a reference signal). The master node 12 sends the synchronization signal and the start signal.

Among a third and later slots, the time slots of odd numbers are time slots of identification signals.

The identification signals are the ID data for identifying the communication channels described with reference to FIG. 2(b), and are in one-to-one correspondence with the communication channels. The master node 12 sends the identification signals. The master node 12 is programmed beforehand about which identification signal in each of identification signal time slots should be transmitted.

Among a fourth and later time slots, the time slots of even numbers are data transmission time slots. A, B, C, . . . , and F in the data transmission time slots exemplify the communication channels in the respective data transmission time slots.

The master node 12 shown in FIG. 2 includes an identification signal sending unit that sends the identification signals designating the communication channels from the master node in the identification signal time slots.

The master node 12 and the slave nodes $13_1$ through $13_n$ shown in FIG. 2 each include a data transmitting unit. When the own node matches the node in which the communication channel (A) designated by an identification signal (the first identification signal) sent from the master node 12 is set in an identification signal time slot (the third time slot, for example), the data transmitting unit performs data transmission through the communication channel (A), based on the set contents of the communication channel (A), in the data transmission time slot (the fourth time slot) corresponding to the identification signal time slot (the third time slot) in which the identification signal has been sent.

In the example illustrated in the figure, the time-divided time slots are alternately allotted to the identification signal time slots and the data transmission time slots. A data transmission time slot corresponding to the identification signal sent in the time slot (of an odd number) immediately before the data transmission time slot is the time slot (of an even number) immediately after the time slot of the odd number. Therefore, in each of the slave nodes $13_1$ through $13_n$, there is only a margin of time equivalent to the later described idle period between the reception of the identification signal designating the communication channel in which each of the slave nodes $13_1$ through $13_n$ is to perform a communication operation and the sending/receiving of data.

However, a time slot a predetermined period of time behind the identification signal time slot may be allotted to the data transmission time slot corresponding to the identification signal time slot.

Although the time-divided time slots are alternately allotted to the identification signal time slots and the data transmission time slots, the time slot in which the data transmission of the communication channel designated by an identification signal is to be performed may be allotted to the time slot (of an even number, for example, the sixth time slot to the third time slot) immediately after the next identification signal time slot, instead of the time slot (of an even number) immediately after the reception of this identification signal.

Alternatively, after time-divided time slots are sequentially allotted to identification signal time slots, time slots behind a predetermined period of time corresponding to the respective identification signal time slots may be sequentially allotted to data transmission time slots. Allotting time-divided time slots to the respective identification signal time slots in the same manner as the above-mentioned method can be repeated.

The time-division transmission sequence illustrated in FIG. 3 is defined by the master node 12. Therefore, in each of the slave nodes $13_1$ through $13_n$, the operation timing of sending/receiving is clear. As a result, only the data transmission which is performed in the identification signal time slot or data transmission time slot that has noise on the serial bus 1 is affected, and any data transmission performed in other time slots is not affected. Accordingly, highly-reliable data transmission is realized.

By a prior art, on the other hand, bus arbitration cannot be controlled, or the cyclic sending sequence is disordered.

The slave nodes $13_1$ through $13_n$ each receive the synchronization signal, and have a clock generator synchronized with the clock signal of the master node 12. The synchronization signal is a signal of a data bit string representing the same data 1 or 0, for example.

The start signal is to cause the slave nodes $13_1$ through $13_n$ to recognize the segment defined by the master node 12. After clock synchronization, the start signal is recognized. The signal waveform of the start signal will be described later, with reference to FIG. 7(f).

The start signal should be allotted to a time slot earlier than the time slot of the first identification signal (the third time slot in the example illustrated in the figure) of one segment. Accordingly, the time slots may be arranged in the following order: the time slot of the start signal (the first time slot), the time slot of the synchronization signal (the second time slot), an identification signal time slot (the third time slot), a data transmission time slot (the fourth time slot), . . . .

If there is no need to identify the one segment in the slave nodes $13_1$ through $13_n$, the start signal does not need to be provided. If there is no need to achieve synchronization with the synchronization signal, the synchronization signal does not need to be provided.

However, as will be later described with reference to FIG. 7, the locations of the even-number time slots and the odd-number time slots can be clearly distinguished, based on the time slot of the start signal.

The above described time slots are allotted at intervals of an integer multiple of each clock cycle of data transmission, and are allotted at intervals of 19 times longer than each clock cycle of data transmission (each time slot is 18 bits long) in the example illustrated in the figure. In the example illustrated in the figure, an idle period (1 bit long) is provided between each two adjacent time slots. Where the idle periods are provided, the idle periods are defined in relation to the clock cycles. For example, an idle bit is inserted at intervals of an integral multiple of the clock period in compliance with a transmission standard, or the voltage level is set at a non-communication level during this period.

FIG. 4 is an explanatory diagram showing an example of the data on which a "set contents table" for performing a communication operation through a communication channel designated by an identification signal is based. As shown in FIG. 4, a communication operation to be performed through a communication channel designated by an identification signal requires the data that indicates the set contents of the communication channel designated by the identification signal, such as the node which performs the operations, whether transmitting or receiving is to be performed by the node, and the information as to the address in the data register.

The nodes to perform operations are a master node and slave nodes 1 through 3 in the table. In reality, however, node numbers are allotted to all the nodes, including the master node, respectively.

FIG. 4 is a table of the set contents of the communication channel for all the nodes. The table of the set contents shown in FIG. 4 may be stored in each of the nodes, particularly, in the master node 12.

However, the "set contents table" that shows only the correspondence between the communication channel set in a subject node, that is, one or more communication channels (or one or more identification signals) corresponding to the node to perform data transmission (transmitting or receiving) and the set contents of the communication channel in the own node should be stored in a memory unit of each node. This "set contents table" is shown in FIG. 10.

However, if it is necessary for a receiving node to recognize by means of identification signals in which region in the transmitting register of which node the received data has been stored, or if it is necessary for a sending node to recognize in which region in the receiving register of which node the sent data is to be stored, it is necessary to store the communication channel set contents of both the sending node and the receiving node of the communication channels that are set in the own node.

In FIG. 4, the identification signal "00000000001" designates the communication channel (A), with the slave 1 (the slave node $13_1$) being the sending node, the master node 12 being the receiving node. Therefore, the slave node $13_1$ sends data to the master node 12. The address of the slave node $13_1$ in the transmit data register is 01H, and the address of the master node 12 in the received data register is 01H.

The identification signal "00000000101" designates the communication channel (E), with the slave 1 (the slave node $13_1$) being the sending node, two nodes (the master node 12 and the slave node $13_2$) being receiving nodes.

The identification signal "00000000110" designates the communication channel (F), with the master node 12 being the sending node, three nodes (the slave nodes $13_1$, $13_2$, and $13_3$) being receiving nodes.

The identification signal "000 0000 0011" designates the communication channel (C), with the slave 3 (the slave node $13_3$) being the sending node, the master node 12 being the receiving node. The identification signal "000 0000 0100" designates the communication channel (D), with the slave 3 (the slave node $13_3$) being the sending node, the master node 12 being the receiving node, likewise.

Accordingly, the communication channels (C) and (D) share the same transmission node and the same receiving node. However, in the communication channel (C), the address in the transmit data register is 01H, and the address in the received data register is 03H. In the communication channel (D), the address in the transmit data register is 02H, and the address in the received data register is 04H. In this manner, the addresses are adjacent to each other.

Those communication channels (C) and (D) are set in two data transmission time slots (the eighth time slot and the tenth time slot in FIG. 3, for example; the two data transmission time slots do not need to be successive ones), so that the data of the two communication channels can be collectively transmitted from the slave node $13_3$ to the master node 12. If the number of communication channels to be used is made larger, data with a greater data length can be transmitted. Where the data to be output by a sensor is long or the data to be input by an actuator is long, such communication channels can be set.

FIG. 5 is an explanatory diagram showing the sending node and the node (the receiving node) of the other end of each communication in a case where the identification signals are specifically designated in the time-division transmission sequence illustrated in FIG. 3.

The receiving nodes of the signals types, "synchronization signal" and "start signal", are all the slave nodes $13_1$ through $13_n$.

On the other hand, the receiving nodes of "identification signals" and "data" specify the nodes that receive or send the "data" by using the "identification signals".

As will be later described with reference to FIG. 9, all the "identification signals" and "data" are received by all the slave nodes $13_1$ through $13_n$.

FIG. 6 are explanatory diagrams showing configuration examples of communication channel allotments in one segment in the time-division transmission sequence illustrated in FIG. 3.

In an example structure 1 shown in FIG. 6(a), the communication channels in one segment are A, B, C, D, E, and F. Therefore, each communication channel can be allotted in one segment only once.

In an example structure 2 shown in FIG. 6(b), the communication channels in one segment are A, B, C, A, D, E, A, and F. One of the communication channels is allotted more than once in one segment. Specifically, the slave node $13_1$ transmits data of three time slots to the master node 12 through the communication channel A in one segment. By increasing the number of allotted time slots in one segment, the capacity of transmission (or the frequency of update) of a communication channel can be made larger than those of the other communication channels, and the transmission delay can be made smaller.

An example structure 3 shown in FIG. 6(c) is an example structure of variable-length segments.

The communication channels in segment 1 are A through F, the communication channels in segment 2 are A and B, the communication channels in segment 3 are A through D, and the communication channels in segment 4 are A and B.

Accordingly, the communication channels A and B have the largest capacity of transmission (or the highest frequency of update) of data, with the communication channels C and D having smaller capacity of transmission of data and the communication channels E and F having the smallest capacity of transmission of data. The communication channels A and B have the smallest transmission delay, with the communication channels C and D having larger transmission delay and the communication channels E and F having the largest transmission delay.

Accordingly, by changing the allotments of communication channels in two or more segments, the capacity of transmission (or the frequency of update) and the transmission delay of each communication channel can be controlled.

As shown in FIG. 6 (c), each one segment can have a variable time length, with time slots (plus idle periods) being a unit.

In this serial bus transmission system, the one segment shown in FIG. 6(a) is set as one unit, the one segment shown in 6(b) is set as one unit, and the plural segments shown in FIG. 6(c) are set as one unit. Accordingly, the unit of transmission may be periodically repeated, transmission may be completed in one unit, or the unit of transmission may be repeated, with different communication channels being allotted to each unit.

When the above described one unit is repeated, the communication channel structure in one unit does not need to be the same among respective segments, and a communication channel structure can be completely freely set. Also, the length of a segment (the number of time slots) does not need to be the same each time, and segments of arbitrary lengths may be combined.

The structure in each segment and the structure of segments shown in FIG. 6 should be stored in the master node 12. The slave nodes $13_1$ through $13_n$ do not need to store the above described segment structures and the like, because the slave nodes $13_1$ through $13_n$ send and receive data in accordance with identification signals.

FIG. 7 are explanatory diagrams showing the transmission format of a data bit string and the transmission channel codes in the identification signal and data transmission time slots in the time-division transmission sequence shown in FIG. 3. Each abscissa axis indicates time.

FIG. 7(a) shows a data bit string. In the example illustrated in the figure, the data bit string is formed with eleven information bits D0 through D10 and five redundant bits D11 through D15 for error detection and correction.

FIG. 7(b) shows the transmission format of the data bit string. In the example illustrated in the figure, a start-stop synchronization method is employed. One bit long start bit is added to the top of the data bit string, and one bit long stop bit is added to the end of the data bit string.

In the example illustrated in the figure, one bit long idle bit is inserted in the "idle period" between the stop bit of the immediately previous time slot and this time slot, and another one bit long idle bit is inserted in the "idle period" between this time slot and the time slot immediately following this time slot.

As shown in FIG. 7(e), the well-known Manchester codes are employed as the transmission channel codes. In the center of one bit section, one of the data values, such as "1", is expressed as a rising transition, and the other data value "0" is expressed as a falling transition. On the boundaries of one bit section, transitions may or may not appear, depending on the previous and later intermediate transitions. The codes are self-clock codes, and can extract the clock timing.

In the example illustrated in the figure, the transmission channel code of the data "1" is used as the start bit and the idle bit, and the transmission channel code of the data value "0" is used as the stop bit.

FIG. 7(f) shows a signal waveform that is an example of the start signal waveform. In the sections that are not omitted by wiggle lines, there are breaches (violations) of the Manchester code rules, as signal transitions do not appear at the center positions denoted by "x" in the bit sections of D15, D13, D3, D1, and the stop bit.

The signal waveform including such violations is not seen in the other time slots.

Therefore, the master node 12 includes a start signal (reference signal) sending unit that sends a start signal (a reference signal) that has such a pattern as not to be sent in the identification signal time slots and the data transmission time slots. The slave nodes $13_1$ through $13_n$ include a reference signal time slot detecting unit that detects the reference time slot by recognizing the reference signal pattern contained in a received signal. The reference signal time slot detecting unit can surely recognize the start signal pattern, unless a large amount of noise is generated. With the start signal being the reference, it is possible to distinguish between the even-number time slots and the odd-number time slots. Accordingly, it is possible to clearly distinguish between the identification signal time slots and the data transmission time slots.

Figure 8:
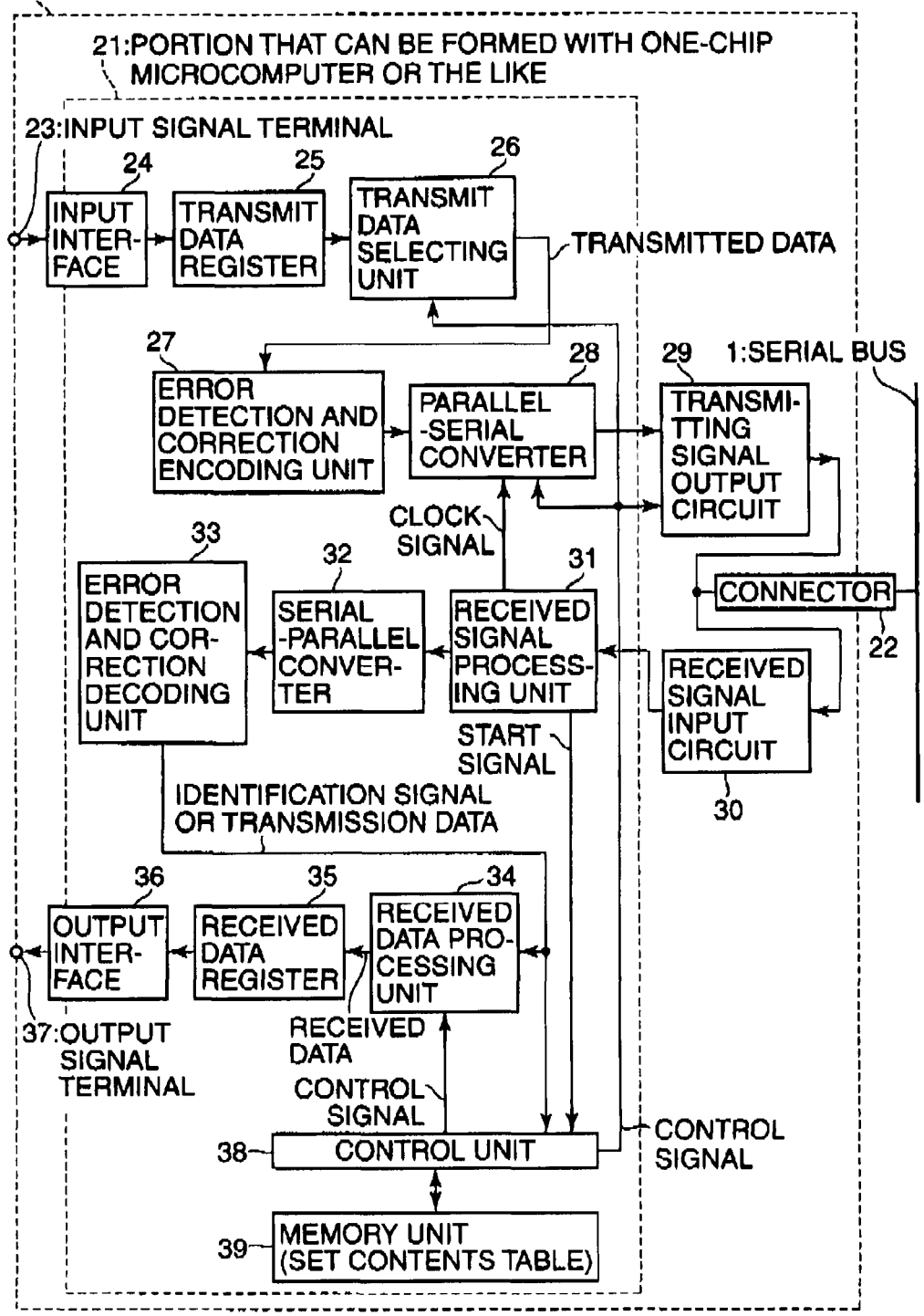
FIG. 8 is a block diagram showing the function structure of one slave node in the serial bus transmission system illustrated in FIG. 2.

FIG. 8 is a block diagram showing the function structure of one of the slave nodes $13_1$ through $13_n$ in the serial bus transmission system illustrated in FIG. 2.

In the figure, a framed block 21 is a functional block that may be formed with the use of a hardware circuit, but can be formed with a one-chip microcomputer or the like.

The slave nodes $13_1$ through $13_n$ are connected to the serial bus 1 via a connector 22.

First, the function structure of the sending side is described.

Reference numeral 23 indicates an input signal terminal, and receives data output from the sensors $5_1$ through $5_m$ shown in FIG. 1. Reference numeral 24 indicates an input interface. When a sensor outputs an analog signal, the input interface 24 A/D converts the analog signal, and outputs digital data.

Reference numeral 25 indicates a transmit data register that temporarily stores the data of more than one bit.

Reference numeral 26 indicates a transmit data selecting unit that selects and outputs the data to be sent to the serial bus 1, or the data of the sensor $5_1$ written in the specific region (designated by an address in the data register set in the communication channel) of the transmit data register 25, for example, in accordance with a control signal from a control unit 38.

Here, the control unit 38 refers to the "set contents table" stored in a memory unit 39. If the slave node matches the node in which the communication channel designated by a received identification signal is set, and the slave node is set at "sending", the control unit 38 outputs respective control signals to the transmit data selecting unit 26, the later described parallel-serial converting unit 28, and the later described transmitting signal output circuit 29.

Reference numeral 27 indicates an error detection and correction encoding unit that adds redundant bits to the data selected by the transmit data selecting unit 25, and outputs parallel data. The error detection and correction encoding unit 27 uses extended hamming codes as error detection and correction codes, and adds the five redundant bits to the eleven information bits, to form the 16-bit data bit string to be sent, as shown in FIG. 7.

For the serial bus transmission system, it is not necessary to convert the identification signals and the transmission data into error detection and correction codes. Therefore, the error detection and correction encoding unit 27 and an error detection and correction decoding unit 33 can be omitted.

Although reference numeral 28 indicates a parallel-serial converting unit above, the parallel-serial converting unit 28 not only converts parallel bits to a serial bit string, but also adds the start bit and the stop bit, and performs conversions into transmission channel codes (Manchester codes in the example in FIG. 7) suitable for the transmission channel.

The parallel-serial converting unit 28 operates in the data transmission time slot to send, in accordance with a control signal from the control unit 38. With reference to the clock signal output from the later described received signal processing unit 31, the parallel-serial converting unit 28 performs encoding to obtain self-clock transmission channel codes (Manchester codes in the example illustrated in FIG. 7).

The transmitting signal output circuit 29 converts the transmission channel code signal into a differential signal voltage, and outputs the differential signal voltage to the serial bus 1 via the connector 22. While not outputting transmitted data, the transmitting signal output circuit 29 puts the output impedance into a high state, in accordance with a control signal from the control unit 38.

Next, the structure of the receiving side is described.

Reference numeral 30 indicates a received signal input circuit that receives a signal of the serial bus 1 via the connector 22, and performs waveform shaping to turn the signal waveform into a rectangular wave prior to outputting. The input impedance of the received signal input circuit 30 is preferably as high as possible, so as not to affect the signal of the serial bus 1. More preferably, the input capacity is 10 pF or lower.

Reference numeral 31 indicates a received signal processing unit that receives the rectangular wave. The received signal processing unit 31 generates the clock, and decodes the transmission channel codes, to regenerate and output the bit data string. The clock signal regenerated here becomes the reference of transmitting signals and received signals in the slave nodes.

The clock generating unit in the received signal processing unit 31 receives a synchronization signal and an identification signal sent from the master node 12, and is synchronized with timings of the level transition points of those signals, as will be later described with reference to FIG. 11.

The received signal processing unit 31 also detects a start signal, and outputs the start signal to the control unit 38.

Reference numeral 32 indicates a serial-parallel converting unit that converts the data bit string having the transmission channel codes decoded, into a 16-bit parallel bit string. Reference numeral 33 indicates an error detection and correction code decoding unit that performs error detection and correction, and outputs an 11-bit data bit string (an identification signal or transmission data of which error has been detected and corrected).

The control unit 38 receives the data bit string of which error has been detected and corrected, and acquires an identification signal of which error has been detected and corrected in an identification signal time slot. The control unit 38 refers to the "set contents table" stored in the memory unit 39. If the slave node matches the node in which the communication channel designated by the identification signal of which error has been detected and corrected is set, and the slave node is set at "receiving", the control unit 38 outputs a control signal to a received data processing unit 34.

In accordance with the control signal output from the control unit 38, the received data processing unit 34 captures received data that is the transmission data of which error has been detected and corrected in a data transmission time slot, from the data bit string of which error has been detected and corrected and then stores the received data in a specific region (designated by an address in the data register set in the communication channel) of a received data register 35.

Reference numeral 36 indicates an output interface that converts the data stored in the received data register 35 into a signal suitable for the circuit being used, and outputs the signal via an output signal terminal 37. The data that is output here is data for controlling drivers, actuators, and the like. In a case where an analog signal is output to the outside, a D/A conversion is performed.

The control unit 38 refers to the "set contents table" (FIGS. 10(b) through 10(d), for example) corresponding to the slave nodes $13_1$ through $13_n$ stored in the memory unit (a nonvolatile, rewritable flash ROM, for example) 39. The control unit 38 then outputs control signals, to perform transmit control and receiving.

The block configuration shown in FIG. 8 is in the form of a functional block diagram of the slave nodes $13_1$ through $13_n$.

The functional blocks of the master node 12 differ from the functional blocks of the slave nodes $13_1$ through $13_n$ in that the transmission control signals such as the synchronization signal, the start signal, and the identification signals shown in FIG. 3 are sent in predetermined time slots, and the clock signal is generated based on the frequency of the reference oscillator of the master node 12.

Figure 9:
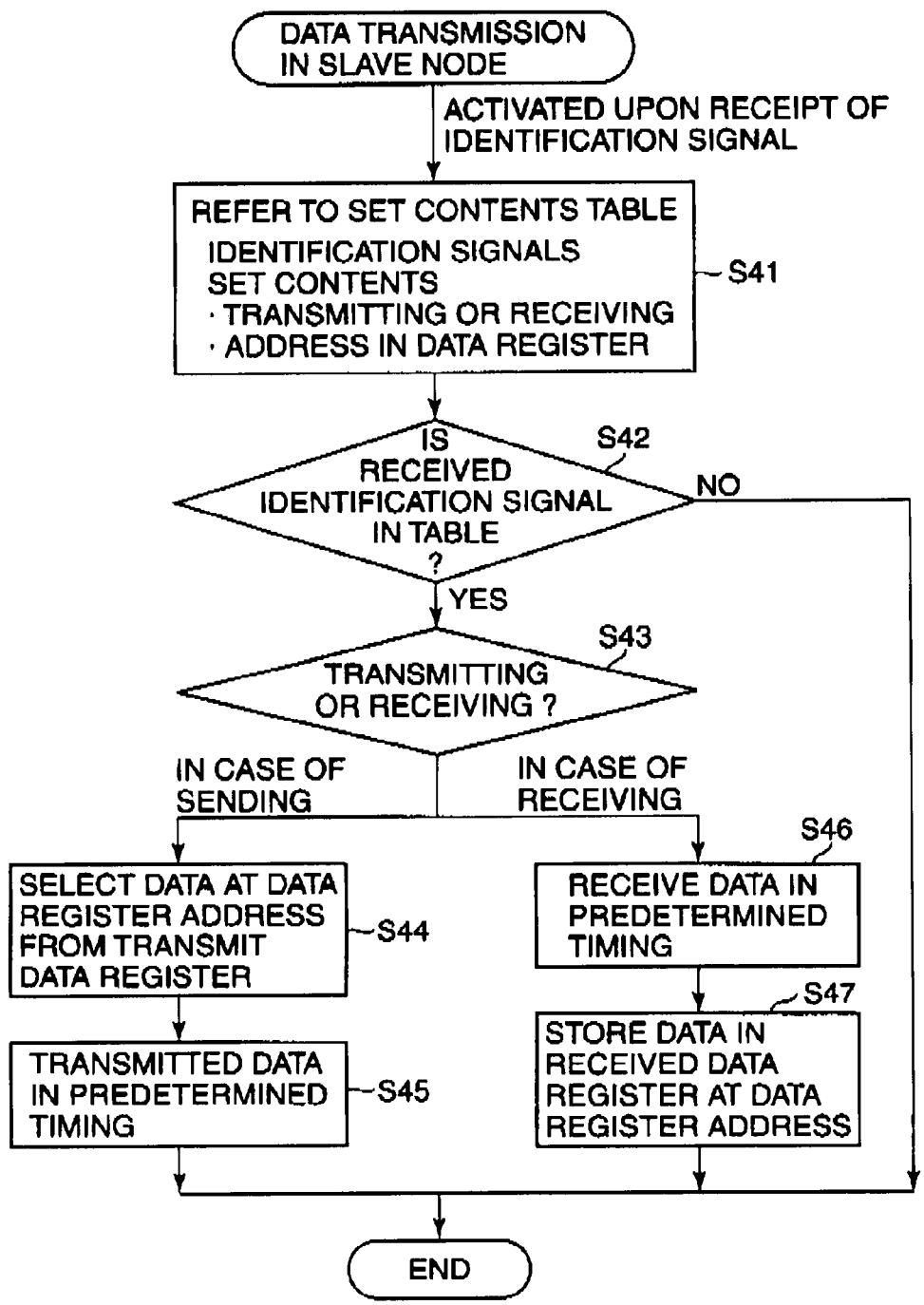
FIG. 9 is a flowchart for explaining a data transmission operation to be performed in a case where the data transmission function of the slave node shown in FIG. 8 is realized by software.

FIG. 9 is a flowchart for explaining a data transmission operation to be performed where the data transmission functions of the slave node illustrated in FIG. 8 are realized by software. The functions of the transmission data selecting unit 26 and the received data processing unit 34, and part of the control unit 38 are realized.

FIG. 10 are diagrams for explaining the "set contents table" stored in the memory units 39 of respective nodes in the serial bus transmission system illustrated in FIG. 2.

This is a qualified version of the "set contents table" described above with reference to FIG. 4, showing only the identification signals necessary for the respective nodes and the set data of the communication channels corresponding to the identification signals.

The flowchart of FIG. 9 starts when an identification signal is received in an identification signal time slot.

At S41, the "set contents table" shown in FIG. 10 with respect to the own node is referred to.

At S42, a check is made to determine whether the received identification signal is in the "set contents table" of the own node. If the received identification signal is in the "set contents table", the operation moves on to S43. If not, the operation comes to an end, and reception of an identification signal is again awaited. In other words, if the received identification signal is an identification signal designating a communication channel that has the own node as a sending node or a receiving node, the operation is continued.

At S43, the "transmitting or receiving" corresponding to the identification signal sent from the master node 12 is referred to in the "set contents table" of the own node. If sending is set, the operation moves on to S44. If receiving is set, the operation moves on to S46.

In the case of sending, at S44, the "address in data register" corresponding to the identification signal sent from the master node 12 is referred to in the "set contents table" of the own node. The data designed by the "address in data register" referred to is selected from the transmit data register. At S45, the selected data is sent at the time of the predetermined data transmission time slot (the next data transmission time slot) corresponding to the time slot of the received identification signal, and reception of an identification signal is again awaited.

In the case of receiving, at S46, data is received at the time of the predetermined data transmission time slot (the next time slot) corresponding to the time slot of the received identification signal. At S47, the "address in data register" is referred to in the "set contents table" of the own node. The received data is stored at the "address in data register" referred to in the received data register, and reception of an identification signal is again awaited.

The data sending and receiving operation shown in FIG. 9 is the same as that of the master node 12. However, there is no need to receive an identification signal, and the operation starts when the master node 12 sends an identification signal.

FIG. 11 are diagrams for explaining a clock generating operation to be performed by the received signal processing unit 31 shown in FIG. 8.

FIG. 11(*a*) is a functional block diagram, and FIG. 11(*b*) is a waveform chart showing the signals of respective blocks.

A received signal 61 that is output from the received signal input circuit 30 of FIG. 8 is input to a gate unit 51.

The gate unit 51 is controlled by a gate control signal 62 that is output from the later described timer unit 54, and allows the received signal 61 to pass in an odd-number time slot. In the example illustrated in FIG. 3, the synchronization signal is also sent in an odd-number time slot.

In a case where the synchronization signal is sent in an even-number time slot, the time slot of the synchronization signal is also designed to allow signals to pass through the gate. The time slot in which the start signal is sent is designed not to allow signals to pass through the gate.

Therefore, the received signal 63 that has passed through the gate unit 51 is only the received signal that is sent from the master node 12 in the time slot of the synchronization signal or an identification signal in the time-division transmission sequence shown in FIG. 3. Since the Manchester codes are self-clock codes, they contain clock components.

A PLL (Phase Locked Loop) clock generating unit 52 performs a phase comparison between the received signal 63 that has passed through the gate unit 51 and a clock signal that is output from the PLL clock generating unit 52. By controlling the bit period of the output clock signal in accordance with the phase difference, the PLL clock generating unit 52 outputs the clock signal that has a phase synchronized with the received signal 63 that has passed through the gate unit 51.

A start signal detecting unit 53 inputs the received signal 61, and detects the start signal by comparing a pattern that does not satisfy the Manchester code rules shown in FIG. 7(*f*) with a start signal pattern that is stored for comparison and reference, for example. When the start signal is detected, the gate signal 62 that is output from the timer unit 54 is forcibly activated at the time of the next-odd number time slot, which is the third time slot. The timer unit 54 counts clocks output from the PLL clock generating unit 52, to output the gate control signal 62 that opens the gate in an odd-number time slot.

A data regenerating unit 55 inputs the received signal 61, and decodes the Manchester codes, based on the clock signal output from the PLL clock generating unit 52. As a result of the decoding, a predetermined data string (all the bits are "1", for example) is output in the synchronization signal time slot, and data is not output in the start signal time slot. As long as there are no errors in the transmission channel, sent data bit strings are output in the identification signal time slots and the data transmission time slots.

A second gate unit may be inserted before the data regenerating unit 55, to allow only the received signals of the identification signal time slots and the data transmission time slots to pass.

In the serial bus transmission system illustrated in FIG. 2, when the "set contents table" is set as a default setting in a newly added slave node, or the communication channel set in an existing slave node is changed, it is necessary to initialize or change the "set contents table" stored in each node shown in FIG. 10.

FIG. 12 are flowcharts of operations to be performed by the master node 12 to set the "set contents table" of the master node 12 shown in FIG. 10, and set the "set contents table" shown in FIG. 10 in the respective slave nodes 13$_1$ through 13$_n$ via the serial bus 1 in the serial bus transmission system illustrated in FIG. 2.

FIG. 12(*a*) is a flowchart of the setting operation in the master node, and FIG. 12(*b*) is a flowchart of the setting operation in a slave node.

The flowcharts shown in FIGS. 12(*a*) and 12(*b*) are carried out by the microcomputers in the master node 12 and the slave nodes 13$_1$ through 13$_n$ according to respective computer programs.

FIG. 13 are diagrams for explaining the "identification signals for setting operations" to be used in the setting operations shown in FIG. 12.

FIG. 13(*a*) is a diagram for explaining the original data of the "set contents table for setting operations", which shows the correspondence between the identification signals for the setting operations and the corresponding communication channels in all the nodes.

FIG. 13(b) is a diagram for explaining the data for the setting operations to be written into the data registers. In the transmit data register of the master node 12, the address at which the data for the setting operation is to be written is set. Likewise, in the received data register of each of the slave nodes $13_1$ through $13_n$, the address at which the data for the setting operation is to be written is set. In the example illustrated in the figure, the same addresses are set in each one data register.

Node numbers are allotted to all the nodes including the master node. Also, each of the nodes at least selects the only data corresponding to the node for which the setting operation is to be performed, from the original data of the "set contents table for setting operations" shown in FIG. 13(a). Each of the nodes stores the selected data into the "set contents table for setting operations".

In the example shown in FIG. 13(a), the "node for which the operation is to be performed" is the "master" or "all slaves", and therefore, all the slave nodes $13_1$ through $13_n$ have the same "set contents table for setting operations".

Figure 12A:
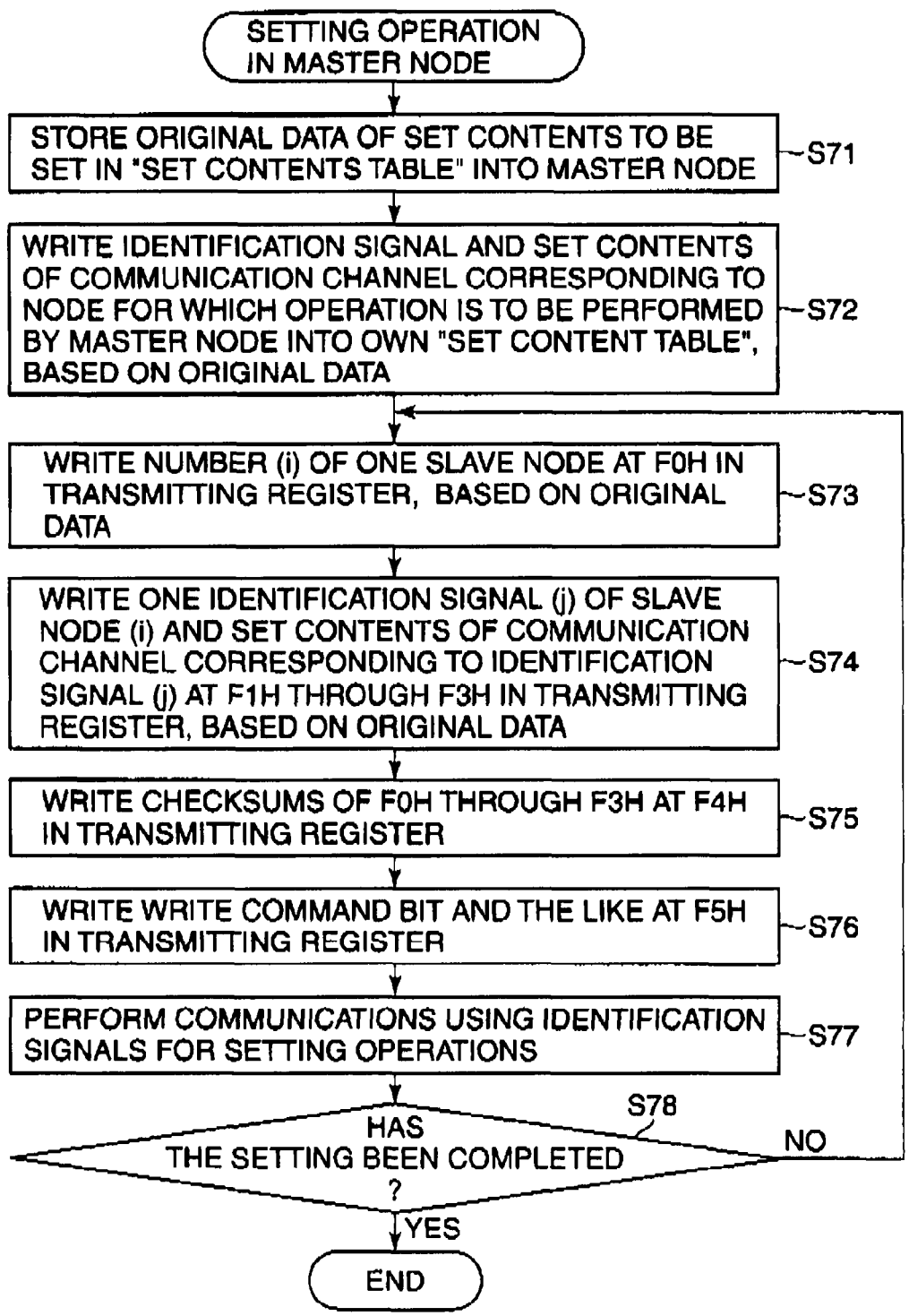
FIG. 12 are flowcharts of operations to be performed by the master node to set the "set contents table" of the master node shown in FIG. 10, and set the "set contents table" shown in FIG. 10 in the respective slave nodes via the serial bus in the serial bus transmission system illustrated in FIG. 2.

At S71 in the flowchart shown in FIG. 12(a), the original data of the "set contents table" for all the nodes (the original data shown in FIG. 4 at the time of initial setting, and data formed by modifying the original data shown in FIG. 4 in the case of a setting change) is stored into the master node 12. This may be manually carried out by a user.

At S72, based on the above mentioned original data, the set contents of the communication channels corresponding to the nodes for which operations are to be performed by the master node 12, as well as the identification signals, are written into the "set contents table" of the master node 12. As a result, the "set contents table" shown in FIG. 10(a) is set. This is carried out through data transfers inside the master node 12.

The procedure of S72 may be skipped, and the above mentioned original data of the "set contents table" for all the nodes may be used as the "set contents table" of the master node 12.

At S73, based on the above described original data, the number (i) of one slave node having the "set contents table" as a subject to be changed is stored at F0H in the transmitting register.

At S74, based on the above described original data, the identification signal (j) that is a subject to be changed in the slave node (i) and the set contents of the corresponding communication channel are written at F1H through F3H in the transmitting register.

At S75, the checksums of F0H through F3H are written at F4H in the transmitting register.

At S76, the data for special operations such as write command bits is written at F5H in the transmitting register.

At S77, communications are performed with the use of the "identification signals for setting operations" shown in FIG. 13(a) in the time-division transmission sequence illustrated in FIG. 3. A setting change is carried out for each one identification signal (communication channel) set for one slave node.

Specifically, the master node 12 includes a setting operation unit that causes the identification signal sending unit to send the "identification signals for setting operations" (the identification signals shown in FIG. 13(a)) from this master node, and also causes the data transmitting unit of this master node to send the information for identifying one slave node (the "number (i) of the slave node $13_1$ for which an operation is to be performed" stored at F0H in the transmitting register, for example), the identification signal (j) for designating the communication channel set in this slave node (the identification signal "000 0000 0001" in FIG. 10(b) for example), and the set contents of this communication channel in this slave node ("transmitting" and "01H" in FIG. 10(b), for example) to the serial bus 1 in the data transmission time slot corresponding to the identification signal time slot in which the above described "identification signals for setting operations" have been sent.

At S78, a check is made to determine whether all the settings have been completed. If all the settings have not been completed, the operation returns to S73. When the set contents of the communication channel corresponding to the identification signal to be changed are changed in all the slave nodes having the "set contents table" to be changed, all the settings are determined to have been completed.

Figure 12B:
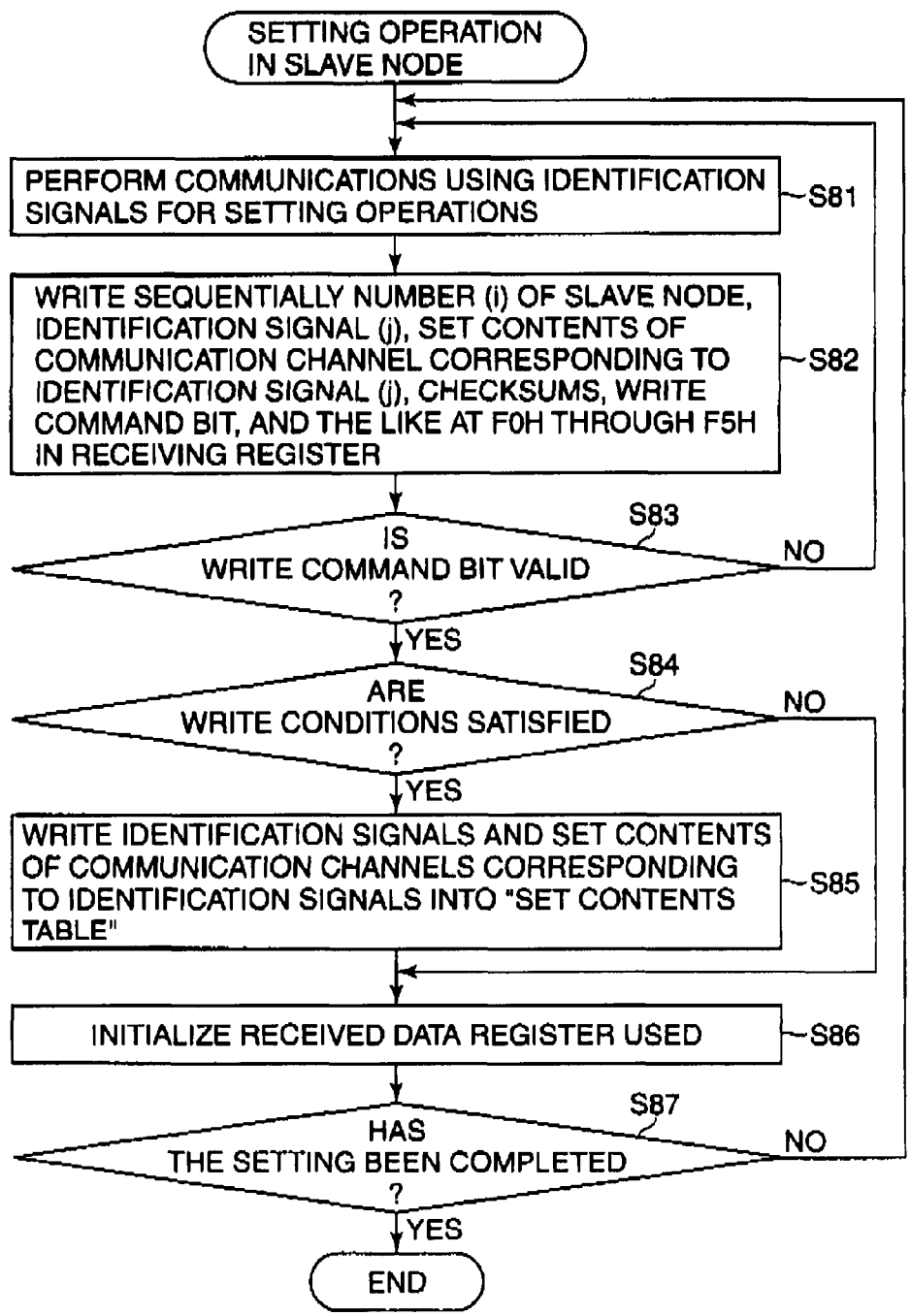

Meanwhile, in each of the slave nodes $13_1$ through $13_n$, communications are performed with the use of the identification signals for settings shown in FIG. 13 at S81 of the flowchart shown in FIG. 12(b).

At S82, the number (i) of the slave node, the identification signal (j), the set contents of the communication channel corresponding to the identification signal (j), the checksums, the write command bits, and the like are sequentially written at F0H through F5H in the receiving register.

Specifically, each of the slave nodes $13_1$ through $13_n$ includes a setting operation unit that causes the data transmitting unit of the slave node to receive the "information for identifying one slave node", the "identification signal for identifying the communication channel set in the one slave node", and the "set contents of the communication channel in the one slave node" in the data transmission time slot corresponding to the identification signal time slot in which the identification signals for setting operations (the identification signals shown in FIG. 13(a), for example) have been sent.

At S83 during the procedures of S81 and S82, a check is made to determine whether the write command bit is valid, or whether the write command bit has been written at F5H. If the write command bit is valid, the operation moves on to S84. If the write command bit is not valid, the operation returns to S81, and received data is sequentially written into the receiving register.

At S84, a check is made to determine whether write conditions are satisfied. If the write conditions are satisfied, the operation moves on to S85. If the write conditions are not satisfied, the operation moves on to S86.

The write conditions are satisfied when the "slave node number" written at the address F0H in the received data register matches the slave node number allotted to the one of the slave nodes $13_1$ through $13_n$, and the value of the checksum written at F4H is normal.

At S85, the identification signals written at the addresses F1H through F3H in the received data register, and the set contents of the communication channels corresponding to the identification signals are written into the "set contents table" of this slave node.

At S86, the used received data register is initialized at F0H through F5H.

Specifically, the above described setting operation unit in each of the slave nodes $13_1$ through $13_n$ has a function to set a correspondence table stored in the memory unit (denoted by 39 in FIG. 8) in accordance with the received "identification signal designating the communication channel set in one slave node" and the received "set contents" in one slave node in the communication channel, when the received "information for identifying one slave node" indicates the slave node performing the operation shown in FIG. 12(b).

At S87, a check is made to determine whether the setting has been completed. If the setting has not been completed, the operation returns to S81, and reception of the next identification signal in the slave node and the set contents of the communication channel corresponding to the identification signal are awaited.

Here, various kinds of methods may be used to determine whether the setting has been completed. For example, the setting is determined to have been completed after a certain period of time has passed.

As described above, the "set contents table" in each node is set. In a case where only part of the "set contents table" is changed, the identification signals to be changed and the set contents of the communication channels corresponding to the identification signals may just be communicated with the use of the identification signals for setting shown in FIG. 13(a).

The node for setting the "set contents table" may not be a regular master node. After a regular master node is switched to a slave node, a temporary master node device is connected to the serial bus, and a setting operation may be performed from the temporary master node device.

In the description with reference to FIG. 1, a power supply line may be used independently of the signal line in a case where electric power supply is supplied from the interface board (for the master) 2 to the interface boards (for slaves) $3_1$ through $3_n$.

Instead, a DC power-supply voltage may be superposed on the serial bus 1. In that case, transmission channel codes without DC components, such as Manchester codes, are used, so that signals and direct current may be separated via a DC cutoff filter and a DC pass filter. As the number of lines is reduced more, the number of cables can be further reduced.

Alternatively, to form a system, a power line of a commercial power supply may be used as the serial bus 1.

In that case, the interface board (for the master) and the interface boards (for slaves) $3_1$ through $3_4$, . . . , and $3_n$ receive power from the commercial power supply, and signals of a carrier-frequency band generated by digital-modulating data encoded by a baseband encoding technique such as the above described Manchester encoding are output to the power line of the commercial power supply. A signal of a carrier-frequency band that is input through the power line is digital-demodulated, to restore the data encoded by the baseband encoding.

INDUSTRIAL APPLICABILITY

The present invention can be applied to control signal data transmission in various devices, such as digital value and analog value data transmission in devices of industrial machines and robot control systems. For example, a large number of cables that connect sensors such as a large number of photo-interrupters to a control microcomputer used in industrial machines are replaced with a serial bus, to install the serial bus transmission system of the present invention. In this manner, the number of cables can be reduced with high reliability.

LIST OF NUMERICAL REFERENCES 1 serial bus
2 interface board (for the master)
$3_1$-$3_n$ interface boards (for slaves)
4 control device
$5_1$-$5_m$ input/output devices
12 master node
$12_R$ receiving register
$12_S$ transmitting register
$13_1$-$13_n$ slave nodes
$13_S$ transmitting register
$13_R$ receiving register
21 functional block that can be formed with one-chip microcomputer or the like
22 connector
25 transmit data register
26 transmit data selecting unit
31 received signal processing unit
34 received data processing unit
35 received data register
51 gate unit
52 PLL clock generating unit
53 start signal detecting unit
54 timer unit
55 data regenerating unit

The invention claimed is:

1. A serial bus transmission system that performs data transmission through a communication channel that is set from one node to at least one other node among a plurality of nodes connected to a serial bus, wherein the serial bus transmission system comprises:

a plurality of identification signal time slots; and
a plurality of data transmission time slots corresponding to the respective identification signal time slots, wherein a plurality of time slots that are time-divided are alternately allotted to the identification signal time slots and data transmission time slots so that a data transmission time slot directly follows an identification signal time slot, with one of the nodes being allotted to a master node while the other nodes are allotted to slave nodes,
wherein the master node includes an identification signal sending unit that sends an identification signal from the master node in the identification signal time slots, the identification signal designating the communication channel; and
wherein each of the nodes includes a data transmitting unit that, when said each node matches a node in which a communication channel designated by an identification signal sent in the identification signal time slots is set, performs data transmission through the communication channel, based on set contents of the communication channel, in a data transmission time slot corresponding to the identification signal time slot in which the identification signal has been sent and that directly follows the corresponding identification signal time slot.

2. The serial bus transmission system according to claim 1, wherein the communication channel is set from a specific region in a transmit data register in the one node to a specific region in a receiving register in the at least one other node.

3. The serial bus transmission system according to claim 1, wherein the time-divided time slots are allotted at intervals of an integral multiple of a clock period of the data transmission.

4. The serial bus transmission system according to claim 3, wherein the slave node includes a gate unit and a clock generating unit, the gate unit blocks a received signal received from the serial bus in the data transmission time slots, and allows the received signal to pass in the identification signal time slots,
the clock generating unit outputs a clock signal synchronized with the received signal that has passed through the gate unit, and
the data transmitting unit in the slave node performs the data transmission based on the clock signal that is output from the clock generating unit.

5. The serial bus transmission system according to claim 1, wherein each of the nodes includes a memory unit, and
the memory unit stores a correspondence table that shows correspondence between one or a plurality of identification signals designating one or more of the communication channels set in said each node, and the set contents of the one or more communication channels in said each node.

6. The serial bus transmission system according to claim 5, wherein the memory unit is a rewritable memory unit,
the master node includes a setting operation unit that causes the identification signal sending unit to send a plurality of identification signals for a setting operation from the master node, and causes the data transmitting unit of the master node to send information for identifying one of the slave nodes, an identification signal designating a communication channel set in the one of the slave nodes, and the set contents of the communication channel in the one of the slave nodes, to the serial bus in data transmission time slots corresponding to identification signal time slots in which the identification signals for the setting operation have been sent, and
each of the slave nodes includes a setting operation unit that causes the data transmitting unit of said each slave node to receive the information for identifying the one of the slave nodes, the identification signal designating the communication channel set in the one of the slave nodes, and the set contents of the communication channel in the one of the slave nodes in the data transmission time slots corresponding to the identification signal time slots in which the identification signals for the setting operation have been sent,
wherein when the received information for designating the one of the slave nodes indicates the slave node, the setting operation unit included in said each of the slave nodes sets a correspondence table that is stored in the rewritable memory unit in accordance with the received identification signal designating the communication channel set in the one of the slave nodes and the received set contents of the communication channel in the one of the slave nodes.

7. The serial bus transmission system according to claim 1, wherein the serial bus transmission system performs data transmission, with one segment being formed by the identification signal time slots and the data transmission time slots corresponding to the respective identification signal time slots.

8. The serial bus transmission system according to claim 7, wherein a reference time slot is allotted beforehand to a time slot before the first identification signal time slot in the one segment unit,
the master node includes a reference signal sending unit that sends a reference signal in the reference time slot, wherein the reference signal has a pattern that is not to be sent in the identification signal time slots and the data transmission time slots, and
the slave nodes each include a reference signal detecting unit that detects the reference time slot by identifying the pattern of the reference signal contained in a received signal.

* * * * *